United States Patent
Koue

(10) Patent No.: US 10,966,148 B2
(45) Date of Patent: Mar. 30, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Toshiaki Koue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 163 days.

(21) Appl. No.: 15/995,727

(22) Filed: Jun. 1, 2018

(65) Prior Publication Data

US 2018/0368062 A1  Dec. 20, 2018

(30) Foreign Application Priority Data

Jun. 16, 2017 (JP) .............................. JP2017-118910

(51) Int. Cl.
| | |
|---|---|
| *H04W 48/20* | (2009.01) |
| *H04B 17/318* | (2015.01) |
| *H04L 1/22* | (2006.01) |
| *H04L 1/20* | (2006.01) |
| *H04W 48/16* | (2009.01) |

(52) U.S. Cl.
CPC .......... *H04W 48/20* (2013.01); *H04B 17/318* (2015.01); *H04L 1/20* (2013.01); *H04L 1/22* (2013.01); *H04W 48/16* (2013.01)

(58) Field of Classification Search
CPC ........... H04B 17/318; H04L 1/20; H04L 1/22; H04W 36/08; H04W 36/24; H04W 36/30; H04W 48/16; H04W 48/20; H04W 74/008; H04W 80/04; H04W 84/12; H04W 84/18; H04W 88/06; H04W 88/08
See application file for complete search history.

(56) References Cited

U.S. PATENT DOCUMENTS

| | | | | |
|---|---|---|---|---|
| 6,940,843 | B2 * | 9/2005 | Goodall ................ | H04L 1/0002 370/332 |
| 7,567,819 | B2 * | 7/2009 | Alone ..................... | H04L 63/10 455/552.1 |
| 8,089,939 | B1 * | 1/2012 | Mater .................... | H04W 36/30 370/332 |
| 8,416,722 | B2 * | 4/2013 | Suzuki .................. | H04L 12/413 370/310 |
| 8,654,741 | B2 * | 2/2014 | Lundsgaard .......... | H04W 48/20 370/332 |
| 9,247,488 | B2 * | 1/2016 | Takeda .................. | H04W 48/16 |
| 10,333,807 | B2 * | 6/2019 | Egner .................... | H04L 69/22 |
| 2010/0217881 | A1 * | 8/2010 | Iino .................... | H04W 12/0602 709/229 |

(Continued)

FOREIGN PATENT DOCUMENTS

| | | |
|---|---|---|
| JP | 2006-080782 A | 3/2006 |
| JP | 2010-232724 A | 10/2010 |

*Primary Examiner* — Frank Duong
(74) *Attorney, Agent, or Firm* — Oliff PLC

(57) ABSTRACT

An information processing apparatus includes a selection unit and a communication unit. If there exist plural access points capable of conducting a communication using a predetermined transmission method among transmission methods by which the information processing apparatus is capable of conducting a wireless communication, the selection unit selects an access point having a high communication quality. The communication unit is configured to conduct a communication with the access point selected by the selection unit.

6 Claims, 15 Drawing Sheets

(56) References Cited

U.S. PATENT DOCUMENTS

2012/0314651 A1* 12/2012 Takamura ............. H04W 76/16
370/328
2013/0223424 A1* 8/2013 Jiang .................... H04W 48/20
370/338

* cited by examiner

FIG.7

| | 710 | 720 | 730 | |
|---|---|---|---|---|
| | PRIORITY | TRANSMISSION METHOD | ACCESS POINT ID | 700 |
| | 1 | 802.11ad | | |
| | 2 | 802.11ac | | |
| | 3 | 802.11n | | |
| | 4 | 802.11g | | |
| | 5 | 802.11b | | |
| | 6 | 802.11a | | |
| | ⋮ | ⋮ | ⋮ | |

FIG.8

| 810 | 820 | 830 | 840 | 850 | |
|---|---|---|---|---|---|
| PRIORITY | TRANSMISSION METHOD | CHANNEL | COMMUNICATION QUALITY | ACCESS POINT ID | 800 |
| | | | | | |

US 10,966,148 B2

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-118910 filed Jun. 16, 2017.

BACKGROUND

Technical Field

The present invention relates to an information processing apparatus and a non-transitory computer readable medium.

SUMMARY

According to an aspect of the invention, an information processing apparatus includes a selection unit and a communication unit. If there exist plural access points capable of conducting a communication using a predetermined transmission method among transmission methods by which the information processing apparatus is capable of conducting a wireless communication, the selection unit selects an access point having a high communication quality. The communication unit is configured to conduct a communication with the access point selected by the selection unit.

BRIEF DESCRIPTION OF THE DRAWINGS

Exemplary embodiments of the present invention will be described in detail based on the following figures, wherein:

FIG. 7 is an explanatory view illustrating an exemplary data structure of a priority table;

FIG. 8 is an explanatory view illustrating an exemplary data structure of a priority table;

DETAILED DESCRIPTION

Hereinafter, an exemplary embodiment suitable for implementing the present invention will be described with reference to the accompanying drawings.

Figure 1:
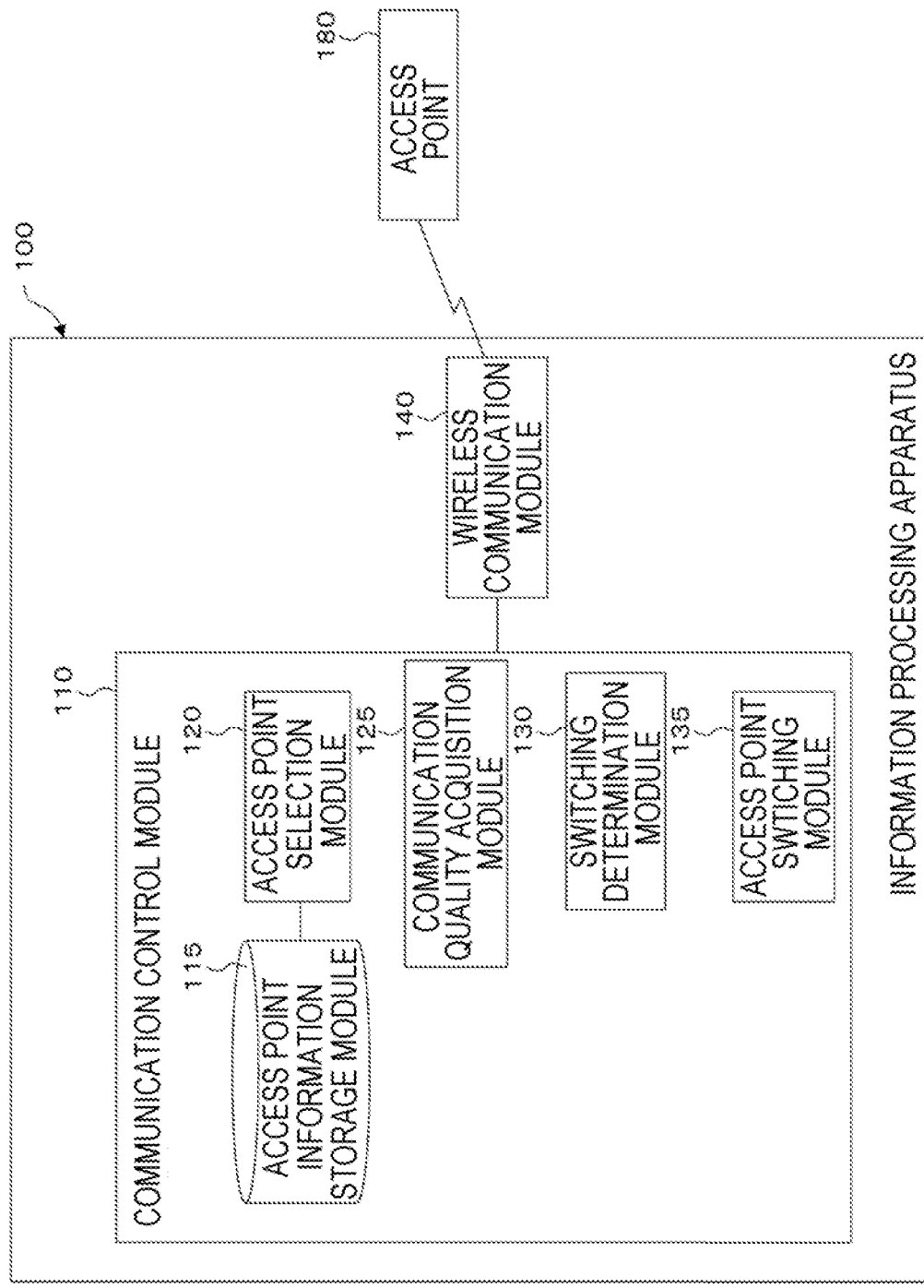
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For the convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In an implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the predetermined values may be different from each other, or two or more of the predetermined values (or all the predetermined values, of course) may be equal to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the present exemplary embodiment conducts a wireless communication. The information processing apparatus 100 includes a communication control module 110 and a wireless communication module 140 as illustrated in the example of FIG. 1. Especially, the information processing apparatus 100 conducts a wireless communication with an access point 180.

The access point 180 is connected to the wireless communication module 140 of the information processing apparatus 100 via a communication line. The access point 180 is a device capable of conducting a wireless communication. The access point 180 receives an access request from the information processing apparatus 100 and mediates a communication with another communication line (for example, the Internet) or another communication device (for example, another information processing apparatus 100, a mobile information terminal, or a notebook PC). In addition, there may be multiple access points 180 capable of conducting a wireless communication with the information processing apparatus 100. For example, there may be multiple access points 180 each equipped with multiple transmission methods such as WiFi and LTE gateway.

The wireless communication module 140 is connected to the communication control module 110. Also, the wireless communication module 140 is connected to the access point 180 via the communication line. The wireless communication module 140 conducts a wireless communication with an access point 180 selected by an access point selection module 120. In addition, the wireless communication module 140 may be capable of conducting a wireless communication by multiple transmission methods. The wireless communication module 140 may also be capable of conducting a wireless communication with multiples access points 180. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

At least one of the transmission methods of the wireless communication module 140 has multiple channels (wireless communication paths). Of course, each of all the transmission methods may have multiple channels.

In addition, the transmission methods using which the wireless communication module 140 is capable of conducting a wireless communication may include at least IEEE802.11ad.

In addition, if there exist multiple other communication devices, the wireless communication module 140 may communicate with multiple access points 180.

The wireless communication module 140 may conduct the communication by allocating more communication destinations (other communication devices) to an access point 180 capable of conducting a communication using the predetermined transmission method, than those allocated to the access points 180 using another transmission method. Here, the "predetermined transmission method" may be a transmission method having the fastest communication speed among transmission methods by which the wireless communication module 140 is capable of conducting a communication.

The communication control module 110 includes an access point information storage module 115, an access point selection module 120, a communication quality acquisition module 125, a switching determination module 130, and an access point switching module 135. The communication control module 110 is connected to the wireless communication module 140. The communication control module 110 controls the wireless communication between the information processing apparatus 100 and the access point 180.

The access point information storage module 115 is connected to the access point selection module 120. The access point information storage module 115 stores information on the access point 180. For example, the access point information storage module 115 stores an access point information table 600 which will be described later using an example of FIG. 6 and the like.

The access point selection module 120 is connected to the access point information storage module 115. If there exist multiple access points 180 capable of conducting a communication using the predetermined transmission method among the transmission methods by which the wireless communication module 140 is capable of conducting a wireless communication, the access point selection module 120 selects an access point 180 having a high communication quality. Here, the "access point 180 having a high communication quality" may be an access point 180 having the highest communication quality among the multiple access points 180 capable of conducting a communication using the predetermined transmission method among the transmission methods by which the wireless communication module 140 is capable of conducting a wireless communication. Alternatively, the "access point 180 having a high communication quality" may be selected by an operator from multiple access points 180 having communication qualities equal to or larger than a predetermined threshold value.

In addition, the "predetermined transmission method" may be a transmission method having the fastest communication speed among transmission methods by which the wireless communication module 140 is capable of conducting a communication.

In addition, the access point selection module 120 may select the access point 180 according to predetermined priorities.

The access point selection module 120 may set the predetermined priorities. For example, the access point selection module 120 may set the predetermined priorities by communicating with the multiple access points 180 periodically or at a time when the power of the information processing apparatus 100 is turned on.

In addition, if there exist multiple other communication devices, the access point selection module 120 may select multiple access points 180. The wireless communication module 140 communicates with the multiple access points 180 selected by the access point selection module 120.

The access point selection module 120 may allocate more communication destinations (other communication devices) to an access point 180 capable of conducting a communication using the predetermined transmission method than those allocated to the access points 180 using another transmission method. Here, the "predetermined transmission method" may be a transmission method having the fastest communication speed among transmission methods by which the wireless communication module 140 is capable of conducting a communication. The wireless communication module 140 communicates with the multiple access points 180 according to the allocation by the access point selection module 120.

The communication quality acquisition module 125 acquires a communication quality of the communication that is being conducted with the access point 180 by the wireless communication module 140. Here, the "communication quality" includes a transmission quality, a connection quality, a stability quality, and the like. For example, the "communication quality" includes a communication speed (for example, delay and responsiveness), stability (for example, data loss rate and reliability), a coverage, and the like. Specifically, the "communication quality" corresponds to detecting a communication speed of a wireless communication, a reception level (radio wave intensity) of a radio signal, an occurrence of disconnection of a wireless communication during the communication and the like.

If there exist multiple access points 180, the switching determination module 130 determines whether another access point 180 having a higher communication quality than the communication quality of the communication that is being conducted with the current access point 180 has become able to communicate.

Here, the "other access point 180 having a higher communication quality than the communication quality of the communication that is being conducted" indicates, for example, an access point 180 which is more superior in the communication speed, the number of errors, or the like than the access point 180 that is currently conducting a communication.

In addition, a "case where another access point 180 has become able to communicate" represents a case where since "another access point 180(B)" could not be selected at the time of starting a communication with an access points 180(A), the communication was conducted using the access point 180(A), and during the communication, the "other access point 180(B)" has become able to communicate. Here, examples of the description "another access point 180B could not be selected" include, for example, (i) a case where a communication had already been conducted in all communication lines of the "other access point 180B" and (ii) a case where the "other access point 180B" could not conduct a communication due to an error or the like.

In addition, the switching determination module 130 may determine whether to perform the switching, according to the remaining communication amount. Here, the description "according to a remaining communication amount" may indicate that a time required for the remaining communication when the communication by the current access point 180(A) is continued and a time required when a communication is started from the beginning by the access point 180(B) that has become in a switchable state are compared to each other and it is determined that one of the former and the latter is shorter than the other.

In addition, if each multiple access point 180 has multiple transmission methods or channels, the switching determination module 130 may switch between the transmission methods or between the channels for one access point 180.

The switching determination module 130 determines whether a channel or transmission method having a higher communication quality than the communication quality of the communication that is being conducted with the access point 180 has become able to communicate.

Here, the "channel or transmission method having a higher communication quality than the communication quality of the communication that is being conducted" represents, for example, a channel or transmission method which is more superior in the communication speed, the number of errors and the like than the channel or transmission method of the communication that is being currently conducted with the access point 180.

In addition, a "case where a channel B1 or a transmission method B2 has become able to communicate" represents a case where since a communication using the channel B1 or the transmission method B2 could not be selected at the time of starting a communication with the access point 180, the communication was conducted using another channel A1 or another transmission method A2, and during the communication, the channel B1 or the transmission method B2 has become able to communicate. Here, examples of the description "a communication using the channel B1 or the transmission method B2 could not be selected" include (i) a case where a communication by the channel B1 or the transmission method B2 has already been conducted and (ii) a case where a communication by the channel B1 or the transmission method B2 could not be conducted due to an error or the like.

In addition, the switching determination module 130 may determine whether to perform the switching, according to the remaining communication amount. Here, the description "according to a remaining communication amount" may indicate that a time required for the remaining communication when the communication by the current channel A1 or transmission method A2 is continued and a time required when a communication is started from the beginning by the channel B1 or the transmission method B2 that has become in a switchable state are compared to each other and it is determined that one of the former and the latter is shorter than the other.

The access point switching module 135 switches between the access points 180 according to the result of the determination, by the switching determination module 130, as to switching between the access points 180. That is, if there exist multiple access points 180 and if another access point 180 having a higher communication quality than the communication quality of the communication that is being conducted with the current access point 180 has become able to communicate, the access point switching module 135 switches the communication that is being conducted to the "other access point 180."

In addition, the access point switching module 135 switches a communication to a channel or transmission method having a higher communication quality, according to the result of the determination by the switching determination module 130 (the result of the determination as to whether a channel or transmission method having a higher communication quality than the communication quality of the communication that is being conducted has become able to communicate). That is, if a channel or transmission method having a higher communication quality than the communication quality of the communication that is being conducted has become able to communicate, the access point switching module 135 switches the communication that is being conducted to the channel or transmission method.

In addition, the access point switching module 135 performs the switching according to a remaining communication amount. That is, the access point switching module 135 switches between the access points 180 according to the result of the determination by the switching determination module 130 (the result of the determination as to whether to switch between the access points 180 according to a remaining communication amount). In addition, the access point switching module 135 switches between channels or between transmission methods according to the result of the determination by the switching determination module 130 (the result of the determination as to whether to switch between communications according to a remaining communication amount).

In addition, when switching between the access points 180, the access point switching module 135 may switch the access point 180 to an access point 180 equipped with the IEEE 802.11ad standard as a transmission method. When switching between the transmission methods, the access point switching module 135 may switch the transmission method to the IEEE802.11ad standard.

Figure 2A:
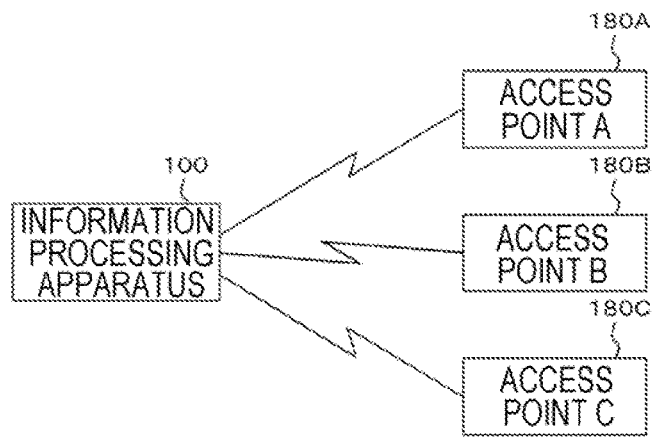
FIGS. 2A and 2B are explanatory views illustrating exemplary system configurations using the exemplary embodiment.
Figure 2B:
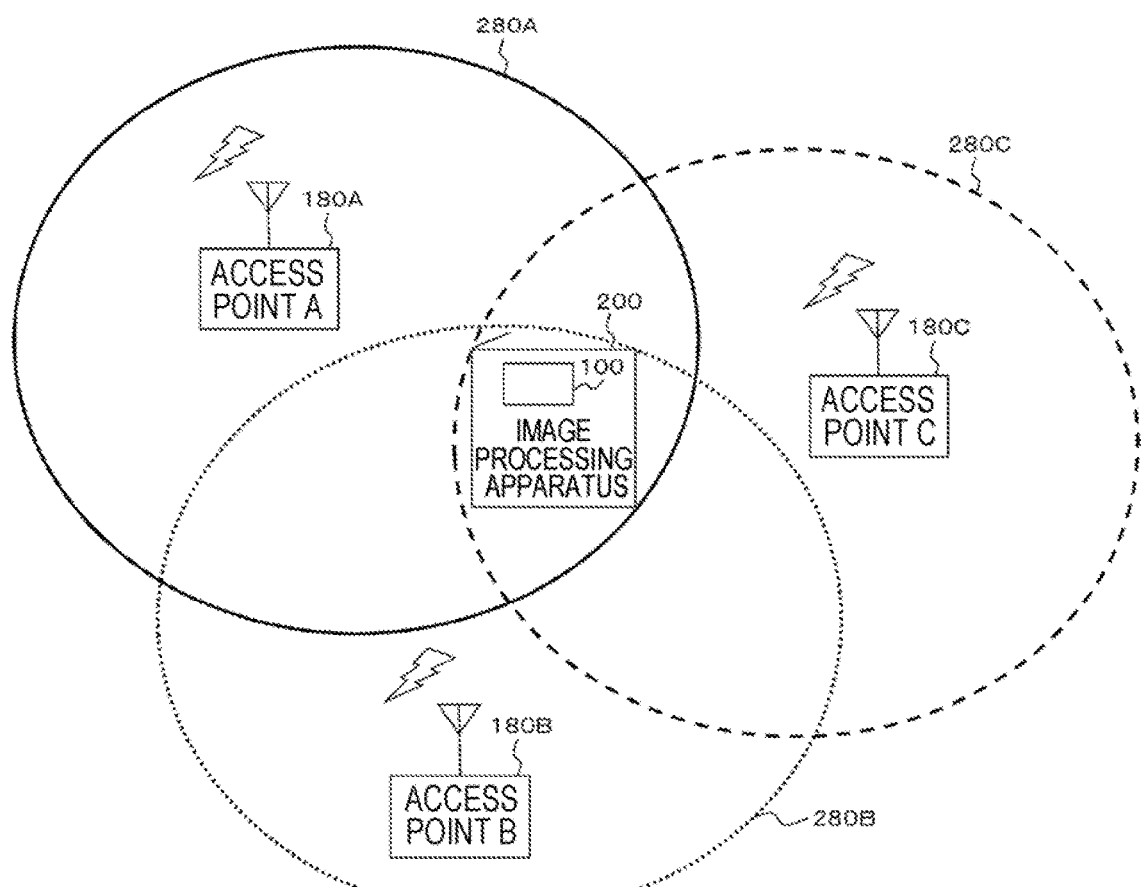

FIGS. 2A and 2B are explanatory views illustrating an exemplary system configuration using the present exemplary embodiment.

As illustrated in the example of FIG. 2A, the information processing apparatus 100 conducts a wireless communication with multiple access points 180 (an access point A: 180A, an access point B: 180B, and an access point C: 180C). The wireless communication is conducted using a transmission method by which it is possible for the information processing apparatus 100 and the access points 180 to communicate with each other. A channel is determined according to a predetermined algorithm at the time of starting the communication.

In the wireless communication, the communication quality may change during the communication. For example, the communication quality may change due to a usage environment, a congestion status, a malfunction, and the like. More specifically, the communication quality may change due to movement of an obstacle for a wireless communication (for example, an automobile, opening/closing of a door, and persons), movement of the information processing apparatus 100 (for example, movement of the owner of the information processing apparatus 100 when the information processing apparatus 100 are mobile devices), use of another device (for example, a microwave oven and other communication devices), and traffics.

The information processing apparatus 100 conducts a communication using a transmission method and channel having the highest communication quality among the transmission methods and the channels using which the information processing apparatus 100 is capable of conducting a communication and the transmission methods and the channels using which the access point 180 as a communication counterpart device is capable of conducting a communication.

For example, if a communication with the access point B: 180B having a higher communication quality than the communication quality of the communication that is being conducted with the access point A: 180A has become able to communicate, the information processing apparatus 100 switches the communication to the access point B: 180B that has become able to communicate.

In addition, if a communication with the access point A: 180A capable of conducting a communication using multiple transmission methods or channels is being conducted and if a communication having a higher communication quality than the communication quality of the communication that is being conducted has become able to communicate, the information processing apparatus 100 switches the current communication to the transmission method or channel of the communication that has become able to communicate.

As illustrated in the example of FIG. 2B, an image processing apparatus 200 may have the information processing apparatus 100.

If the access point A: 180A has a coverage area 280A, the access point B: 180B has a coverage area 280B, the access point C: 180C has a coverage area 280C, and the image processing apparatus 200 is provided in the area where the coverage areas overlap with each other, the image processing apparatus 200 is capable of communicating with the access point A: 180A, the access point B: 180B, and the access point C: 180C.

For example, a user operates a communication device so as to transmit a printing instruction to the image processing apparatus 200 via the access point 180 and get a printed matter from the image processing apparatus 200. In addition, the user performs a scanning operation with the image processing apparatus 200 so as to transmit a scanned image to a communication device and store the image in the communication device.

Figure 3:
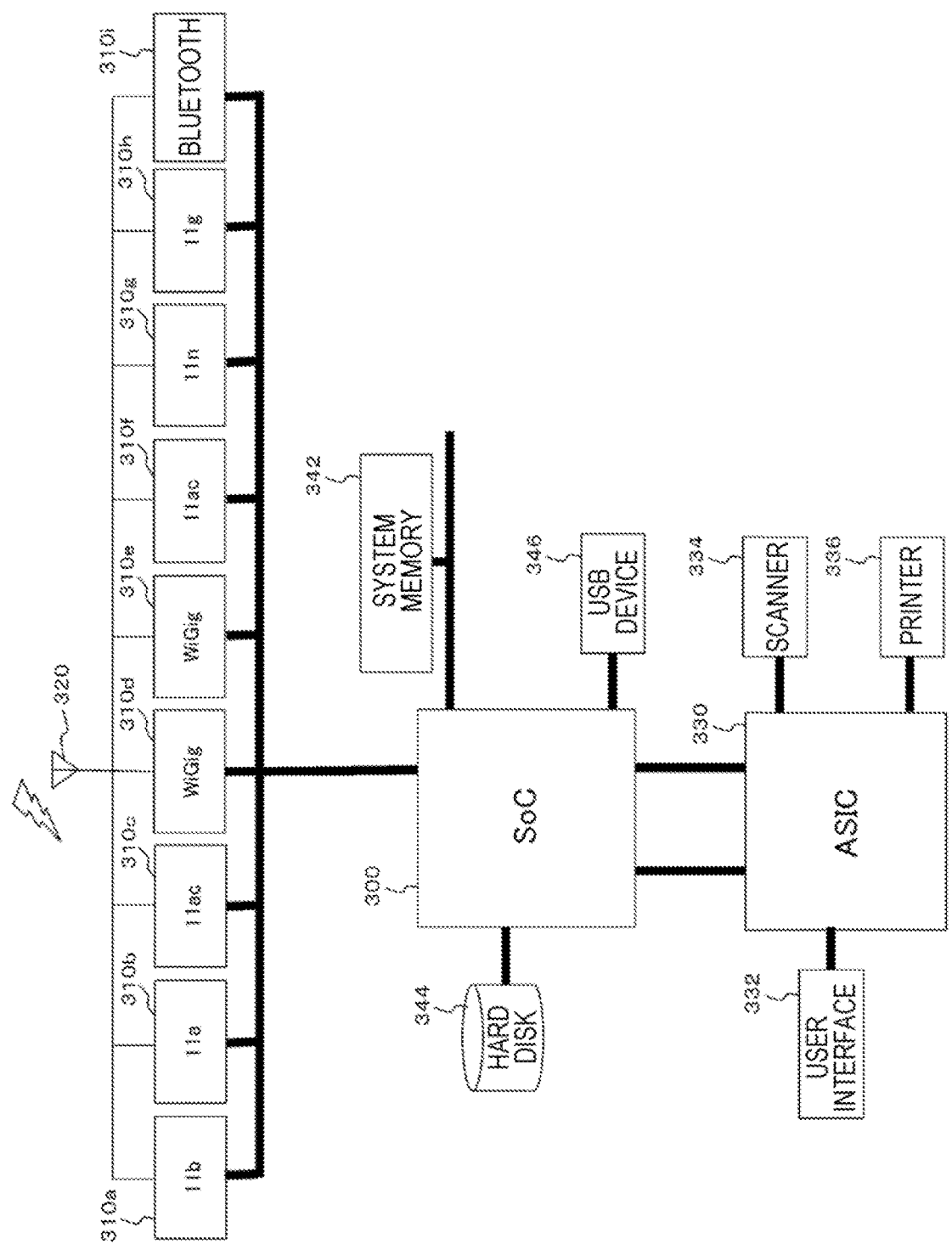
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310*a*, 11a:310*b*, 11ac:310*c*, WiGig:310*d*, WiGig:310*e*, 11ac:310*f*, 11n:310*g*, 11g:310*h*, Bluetooth 310*i*, an antenna 320, a system memory 342, a hard disk 344, a USB device 346, an application specific integrated circuit (ASIC) 330, a user interface 332, a scanner 334, and a printer 336.

11b:310*a* is connected to the antenna 320 and the SoC 300. 11a:310*b* is connected to the antenna 320 and the SoC 300. 11ac:310*c* is connected to the antenna 320 and the SoC 300. WiGig:310*d* is connected to the antenna 320 and the SoC 300. WiGig:310*e* is connected to the antenna 320 and the SoC 300. 11ac:310*f* is connected to the antenna 320 and the SoC 300. 11n:310*g* is connected to the antenna 320 and the SoC 300. 11g:310*h* is connected to the antenna 320 and the SoC 300. Bluetooth 310*i* is connected to the antenna 320 and the SoC 300. The antenna 320 may be shared. Further, multiple antennas 320 may be provided. The combination of the communication devices (communication chips) 310 and the antenna 320 is an implementing example of the wireless communication module 140 illustrated in the example of FIG. 1. 11b:310*a* to 11g:310*h* comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310*i* other than the "IEEE802.11 standard" may be used.

The SoC 300 is connected to 11b:310*a*, 11a:310*b*, 11ac:310*c*, WiGig:310*d*, WiGig:310*e*, 11ac:310*f*, 11n:310*g*, 11g:310*h*, Bluetooth 310*i*, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. In the hard disk 344, for example, communication contents are stored.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
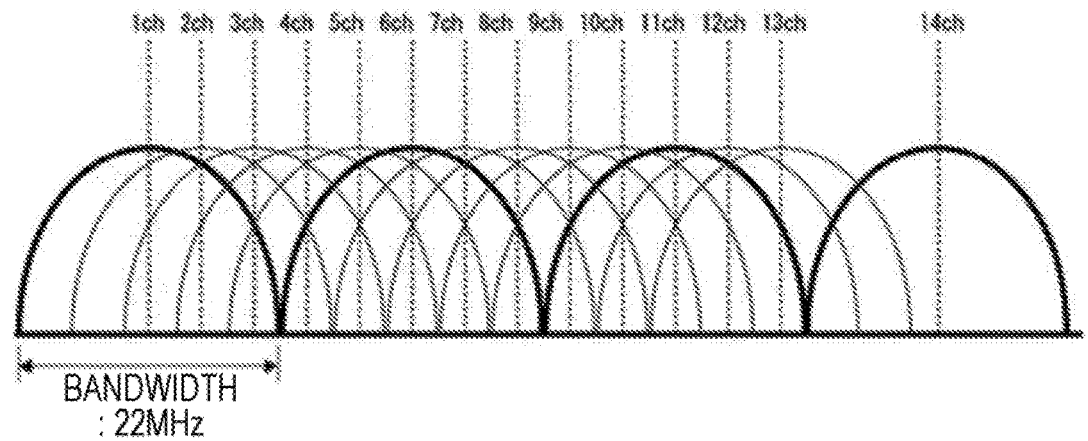
FIGS. 4A and 4B are explanatory views illustrating examples of channels.
Figure 4B:
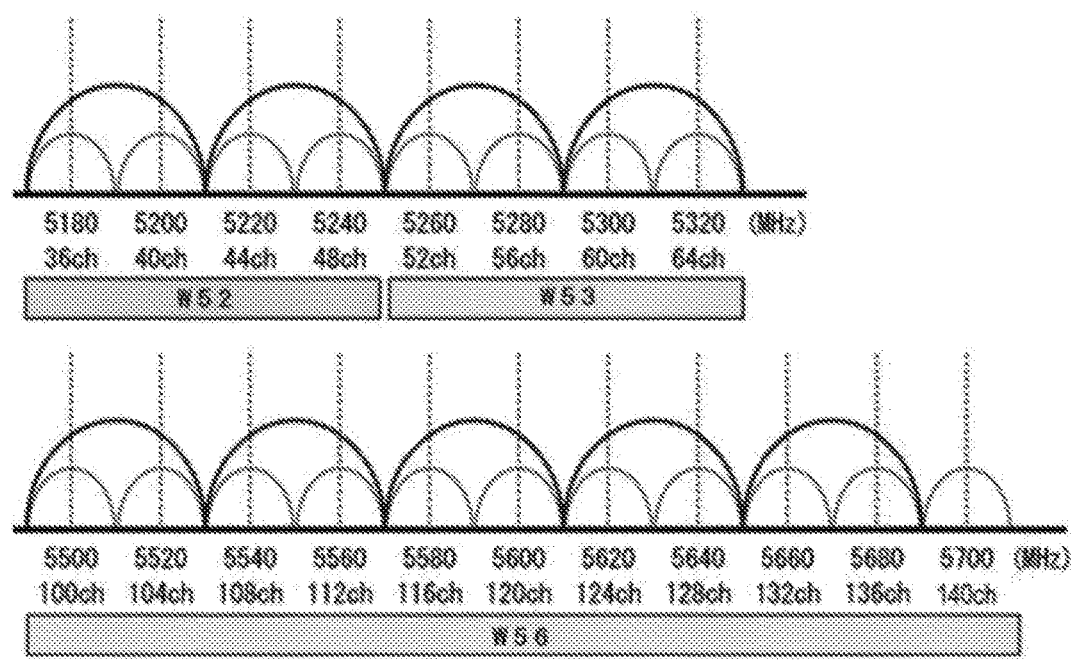

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch to another transmission method even during a communication.

In addition, it may be effective to switch to another channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz in Japan and Europe. The frequency band is divided into 11 channels of 1 ch to 11 ch each having the channel width of 20 MHz in the United States.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band in Japan, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present in Japan and Europe. Not illustrated in FIG. 4B, in IEEE802.11a/n/ac using the 5 GHz band, 24 channels are present in the United States. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching between the channels, a "channel bonding" function (a high speed mode) may be included. That is, as the switching between the channels, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching between the transmission methods, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
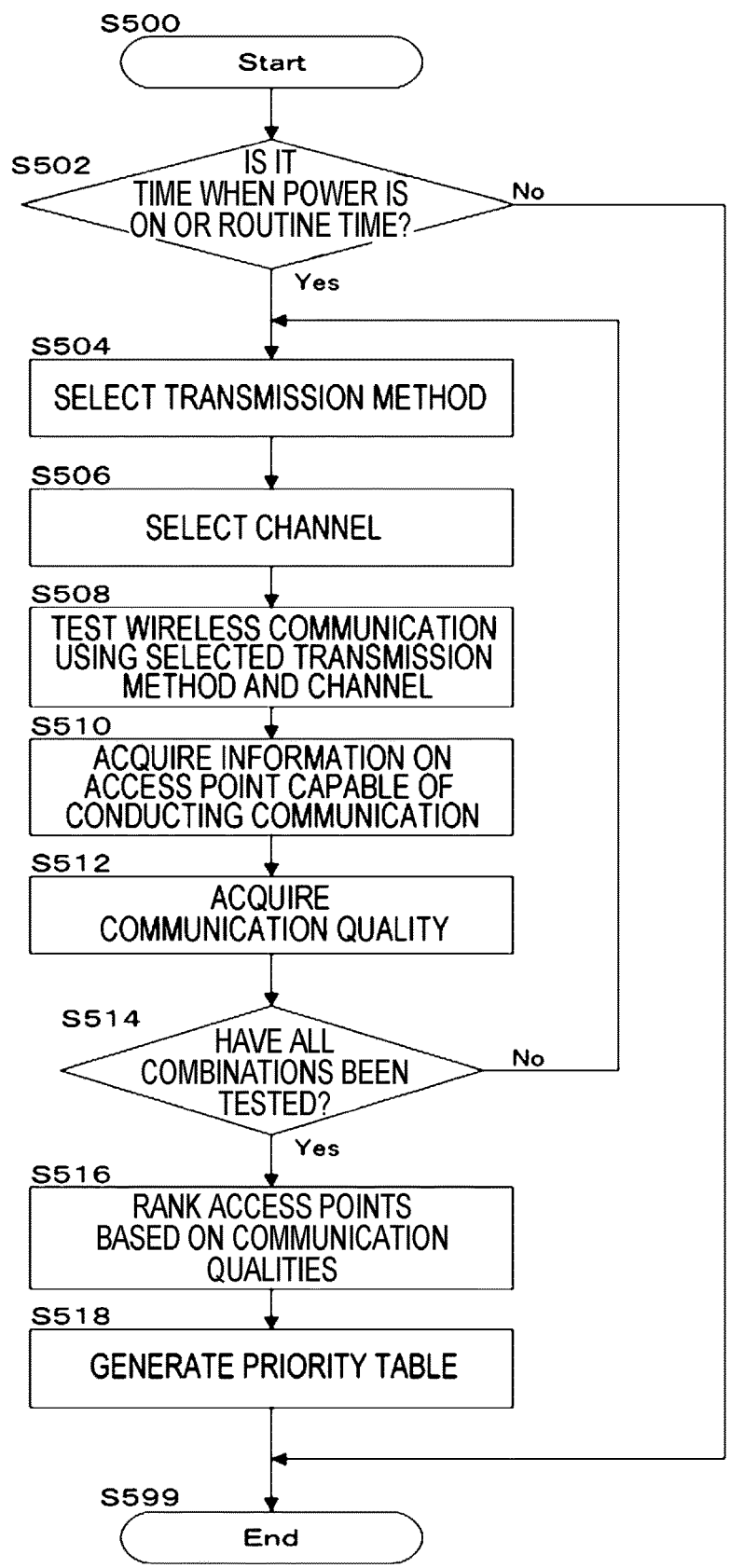
FIG. 5 is a flowchart illustrating an exemplary process by the exemplary embodiment.

FIG. 5 is a flowchart illustrating an exemplary process according to the present exemplary embodiment (information processing apparatus 100). When the information processing apparatus 100 is installed, the information processing apparatus 100 may automatically send a radio signal and receive a reception signal from the access point 180 which is a counterpart device by a diagnosis function (auto-diagnosis function) of the information processing apparatus 100, and may construct a combination of optimal transmission method and channel (may generate the priority table 800) according to the obtained detection data.

In step S502, it is determined whether it is the time when the power of the information processing apparatus 100 is turned on (including the installation time (the initial setting time)) or whether it is the routing time (which comes every predetermined time period, for example, every 12 o'clock on Monday). If it is determined that it is the time when the power is turned on or that it is the routine time, the process proceeds to step S504. Otherwise, the process is ended (step S599). The reason for determining whether it is the time when the power is turned on is that communication environments (place and area) after the turn-on of the power are determined. In addition, since the communication environments may also change, the communication environments are periodically detected.

In step S504, a transmission method is selected. An order in which a target transmission method is selected from among multiple transmission methods may be determined in advance.

In step S506, a channel is selected. An order in which a target channel is selected from among multiple channels may be determined in advance.

In step S508, a test wireless communication is conducted using the transmission method and the channel selected in steps S504 and S506.

In step S510, information on the access points 180 capable of conducting a communication is acquired. For example, the access point information table 600 is acquired.

Figure 6:
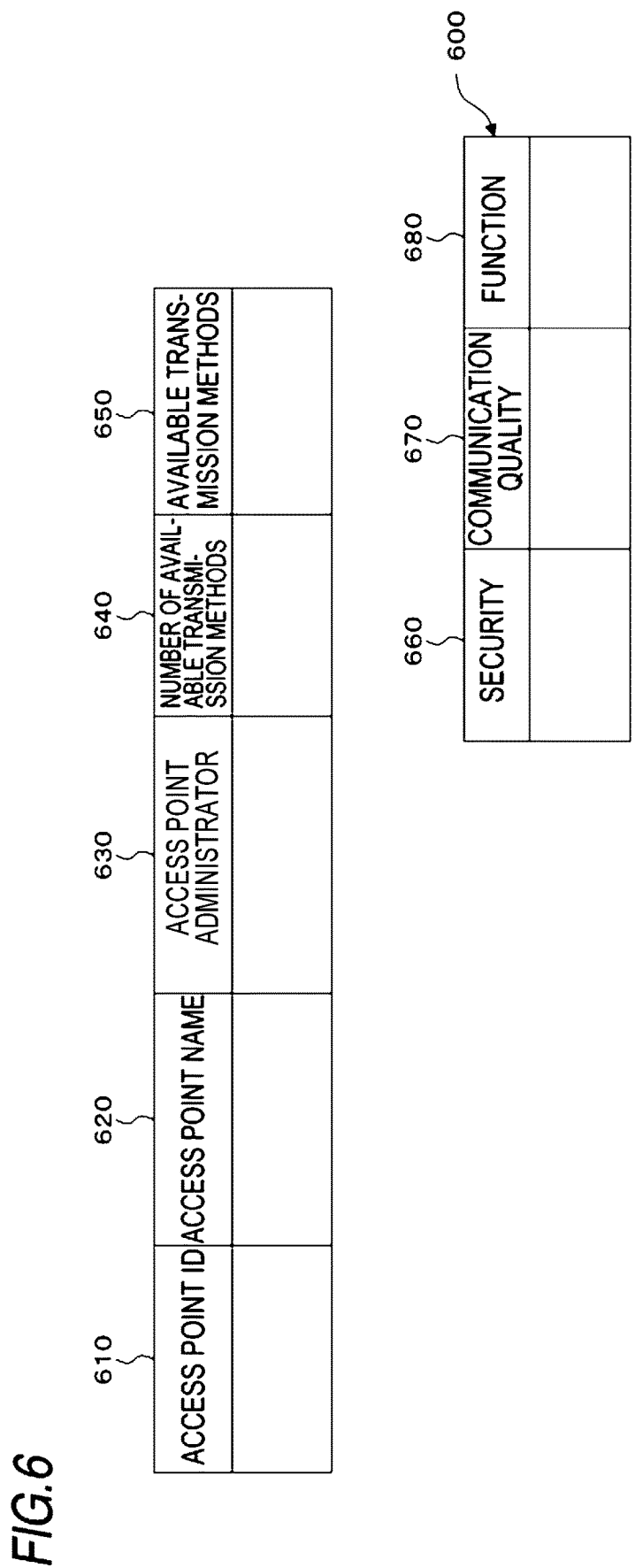
FIG. 6 is an explanatory view illustrating an exemplary data structure of an access point information table.

FIG. 6 is an explanatory view illustrating an exemplary data structure of the access point information table 600. The access point information table 600 includes an access point ID column 610, an access point name column 620, an access point administrator column 630, a number of available transmission methods column 640, an available transmission method column 650, a security column 660, a communication quality column 670, and a function column 680. The access point ID column 610 stores information (access point identification (ID)) for uniquely identifying the access point 180 in the present exemplary embodiment. The access point ID may be a service set identifier (SSID). The access point name column 620 stores the name of the access point 180 (SSID). The access point administrator column 630 stores an administrator of the access point 180. The number of available transmission methods column 640 stores the number of transmission methods available for the access point 180. The available transmission method column 650 stores available transmission methods in the access point 180. The available transmission method column 650 stores transmission methods equal to the number of the available transmission methods in the number of available transmission methods column 640. The security column 660 stores an encrypting method of the access point 180. The communication quality column 670 stores a communication quality in the access point 180. The communication quality column 670 may store a communication quality for each transmission method. In addition, the communication quality column 670 may store the communication quality measured in step S512. The function column 680 stores a function of the access point 180. For example, the function may be an ability to connect to the Internet or the like.

In step S512, the communication quality in the communication with the access points 180 using the transmission method and the channel is acquired. The communication quality is measured by actually communicating with the access points 180.

In step S514, it is determined whether all combinations have been tested. If it is determined that all combinations have been tested, the process proceeds to step S516. Otherwise, the process returns to step S504.

In step S516, the access points 180 are ranked based on the communication quality. That is, an access point 180 having a high communication quality ranks high.

In step S518, a priority table is generated. For example, the priority table 800 is generated.

One of the priority tables 700, 800, and 900 is used as the priority table. Which of the priority tables is to be used may be set by the administrator of the information processing apparatus 100 or determined in advance as a default. The priority tables 700 and 900 may be generated in advance. The priority table 800 is generated (updated) by the above-described process according to the flowchart illustrated in the example of FIG. 5.

FIG. 7 is an explanatory view illustrating an exemplary data structure of the priority table 700. The priority table 700 has a priority column 710, a transmission method column 720, and an access point ID column 730. The priority column 710 stores priorities. In the example of FIG. 7, priorities are allocated in an order of a transmission speed from the fastest. The transmission method column 720 stores transmission methods corresponding to the priorities. The access point ID column 730 stores access point IDs of the access points 180 corresponding to the priorities.

FIG. 8 is an explanatory view illustrating an exemplary data structure of the priority table 800. The priority table 800 has a priority column 810, a transmission method column 820, a channel column 830, a communication quality column 840, and an access point ID column 850. The priority column 810 stores priorities. The transmission method column 820 stores transmission methods corresponding to the priorities. The channel column 830 stores channels corresponding to the priorities. The communication quality column 840 stores communication qualities. The access point ID column 850 stores access point IDs of the access points 180 corresponding to the priorities. The priority table 800 allows to select, for example, a combination of a transmission method and a channel which have a fast communication speed and cause the small number of communication errors. The number of communication errors may be calculated from past communication histories. In addition, the priority table 800 may include the combinations of the transmission methods and the channels that are ranked by the process of the flowchart illustrated in the example of FIG. 5.

Figure 9:
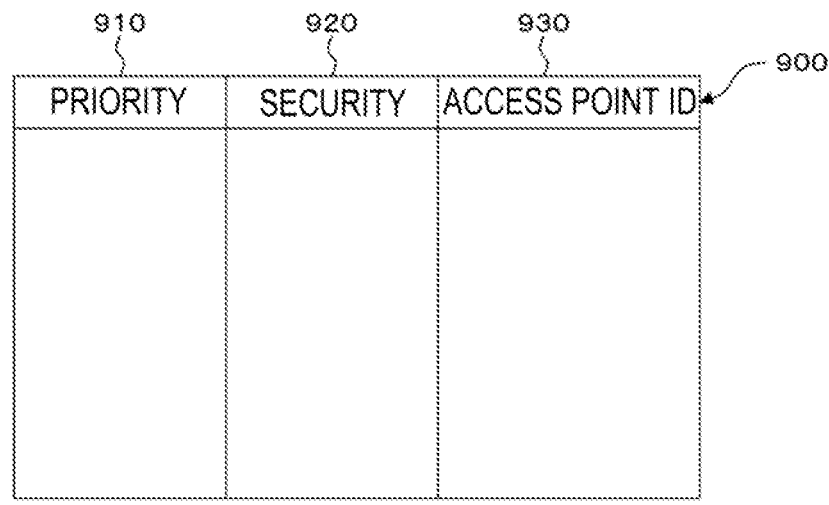
FIG. 9 is an explanatory view illustrating an exemplary data structure of a priority table.

FIG. 9 is an explanatory view illustrating an exemplary data structure of the priority table 900. The priority table 900 has a priority column 910, a security column 920, and an access point ID column 930. The priority column 910 stores priorities. The security column 920 stores securities (encrypting methods) corresponding to the priorities. For example, the securities include WEP, WPA-TKIP, WPA 2-AES, IEEE 802.1X and the like. The access point ID column 930 stores access point IDs of the access points 180 corresponding to the priorities.

Figure 10:
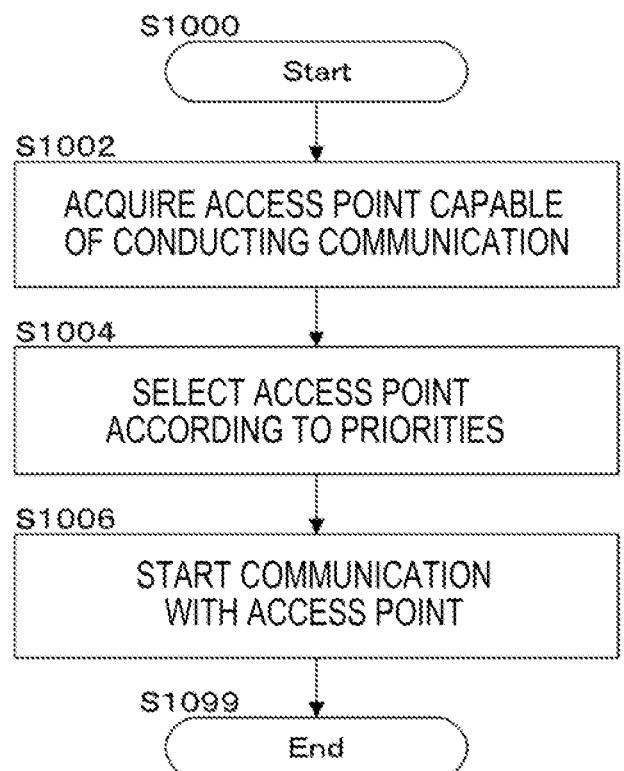
FIG. 10 is a flowchart illustrating an exemplary process by the exemplary embodiment.

FIG. 10 is a flowchart illustrating an exemplary process by the present exemplary embodiment.

In step S1002, access points 180 capable of conducting a communication are acquired. A test wireless communication may be conducted.

In step S1004, an access point 180 is selected according to priorities. For example, if priorities follow a communication speed, the priority table 700 may be used. If priorities follow a communication quality when a communication is actually conducted, the priority table 800 may be used. If priorities follow an encryption strength, the priority table 900 may be used. In addition, an access point 180 may be selected under the condition that the access point 180 has a predetermined function. For example, if a connection to the outside (the Internet) is necessary and if there exists an access point 180 that may serve as a gateway to the outside among the access points 180 capable of conducting a communication, the access point 180 that may serve as a gateway to the outside may be selected, instead of selecting an access point 180 according to the fastest communication speed or the like. In addition, connection to multiple access points 180 may be performed.

In step S1006, a communication with the access point 180 selected in step S1004 is started.

Figure 11:
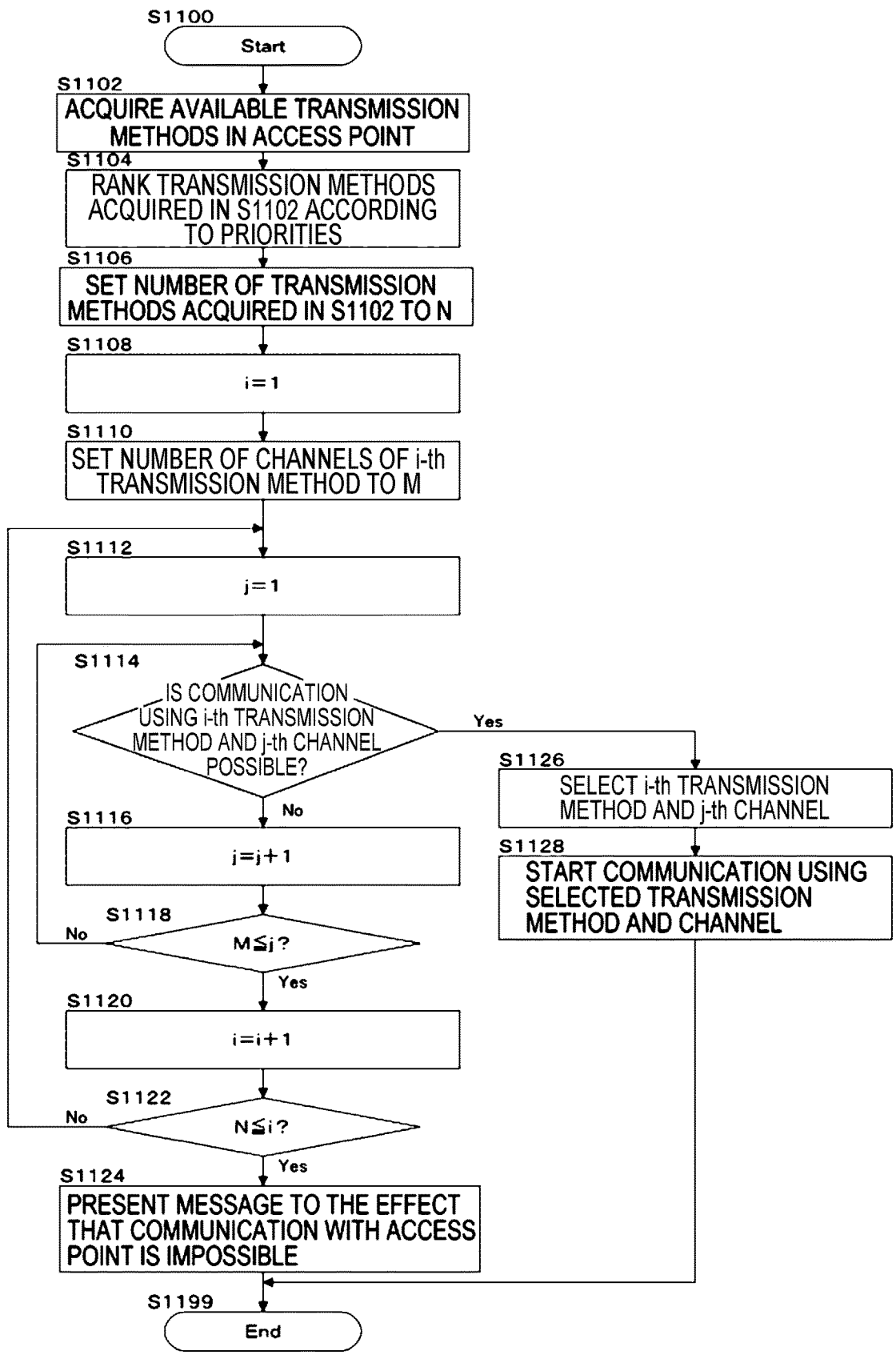
FIG. 11 is a flowchart illustrating an exemplary process by the exemplary embodiment.
Figure 12:
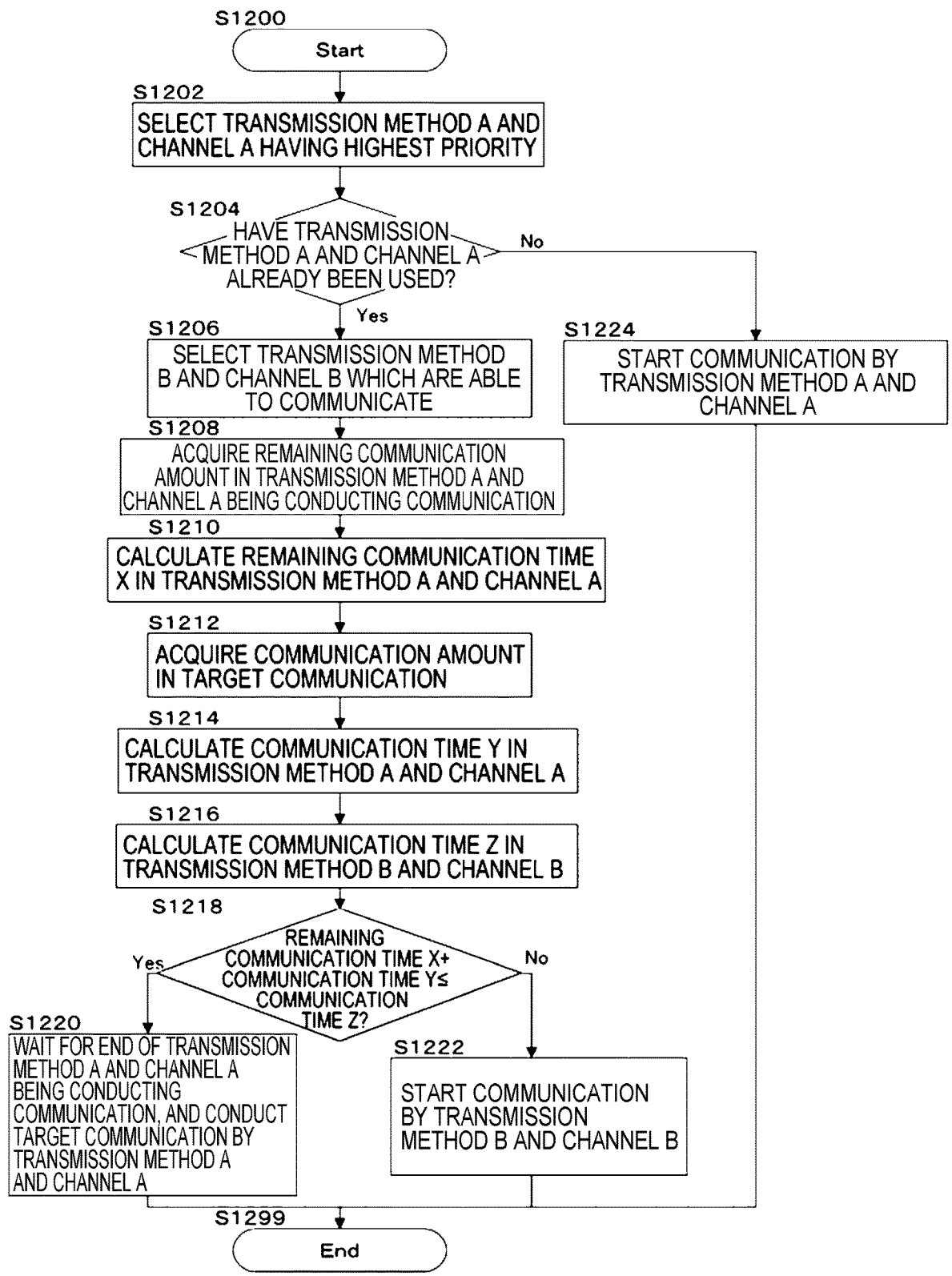
FIG. 12 is a flowchart illustrating an exemplary process according to the exemplary embodiment.

After the access point 180 is selected according to the flowchart illustrated in the example of FIG. 10, a transmission method and a channel are determined for the communication with the access point 180 according to a flowchart illustrated in an example of FIG. 11 or 12. It should be noted that if the priority tables 700 and 800 are used, a transmission method (or a transmission method and a channel) has also been determined, but it is verified whether a communication is actually possible by the transmission method (or the transmission method and the channel).

FIG. 11 is a flowchart illustrating an exemplary process according to the present exemplary embodiment (mainly, the access point selection module 120). This process selects a transmission method and a channel in starting a communication.

In step S1102, available transmission methods in the access point 180 are acquired from the access point information storage module 115. For example, the available transmission methods are acquired from the available transmission method column 650 of the access point information table 600 stored in the access point information storage module 115.

In step S1104, the transmission methods acquired in step S1102 are ranked according to priorities. For example, the priority table 700 or 800 may be used as the priorities. That is, the available transmission methods in the access point 180 are ranked according to the priority table 700 or 800.

In step S1106, the number of transmission methods acquired in step S1102 is set to N. For example, the number of available transmission methods in the number of available transmission methods column 640 of the access point information table 600 stored in the access point information storage module 115 may be set to N.

In step S1108, i=1 (1 is substituted into a variable i). Here, the variable i indicates a ranking of a transmission method.

In step S1110, the number of channels in an i-th transmission method is set to M.

In step S1112, j=1 (1 is substituted into a variable j). Here, the variable j indicates a ranking of a channel. If channels are assigned with no priorities (in the case of the ranking using the above-described priority table 700), the channels may be ranked in an arbitrary manner (for example, in an order of channel numbers).

In step S1114, it is determined whether a communication using the i-th transmission method and the j-th channel is possible. If it is determined that the communication is possible, the process proceeds to step S1126. Otherwise (for example, if the i-th transmission method and the j-th channel are being used in any of the information processing apparatus 100 and the access point 180 or if an error occurs), the process proceeds to step S1116.

In step S1116, j=j+1 (the variable j is incremented).

In step S1118, it is determined whether M≤j. If it is determined that M≤j (if the determination has been made for all the channels in the i-th transmission method in step S1114), the process proceeds to step S1120. Otherwise, the process returns to step S1114.

In step S1120, i=i+1 (the variable i is incremented).

In step S1122, it is determined whether N≤i. If it is determined that N≤i (in a case where the determination has been made for all the available transmission methods in the target access point 180 in step S1114), the process proceeds to step S1124. Otherwise, the process returns to step S1112.

In step S1124, a message is presented to the effect that the communication with the access point 180 is impossible. In addition, the access point 180 may be set in a queue.

In step S1126, the i-th transmission method and the j-th channel are selected.

In step S1128, the wireless communication module 140 starts communication using the transmission method and channel selected in step S1126. Thus, the communication is conducted by the transmission method and channel according to the priorities, among the transmission methods and the channels using which the access point 180 and the information processing apparatus 100 are capable of communicating with each other.

FIG. 12 is a flowchart illustrating an exemplary process according to the present exemplary embodiment (mainly, the access point selection module 120). This process selects a transmission method and a channel in starting a communication (referred to as a "target communication" in the example of FIG. 12), and is different from the process of the flowchart illustrated in the example of FIG. 11.

In step S1202, a transmission method A and a channel A which have the highest priority are selected. Specifically, among the transmission methods and the channels using which a communication between the information processing apparatus 100 and the access point 180 is possible (merely the possibility is sufficient), a transmission method and a channel which have the highest priority may be selected from the priority table 700 or 800.

In step S1204, it is determined whether the selected transmission method A and channel A have already been used in the information processing apparatus 100 or the access point 180. If it is determined that the transmission method A and the channel A have already been used, the process proceeds to step S1206. Otherwise, the process proceeds to step S1224.

In step S1206, a transmission method B and a channel B which are able to communicate are selected. Specifically, a transmission method and a channel using which a communication between the information processing apparatus 100 and the access point 180 is possible (it is only required to be able to actually conduct the communication) may be selected. For example, a transmission method and a channel which have the second highest priority after the transmission method A and the channel A may be selected.

In step S1208, a remaining communication amount of the communication that is being conducted using the transmission method A and the channel A is acquired. This process aims to calculate a remaining communication time X (so-called standby time) until the communication using the transmission method A and the channel A is ended.

In step S1210, the remaining communication time X in the transmission method A and the channel A is calculated. A nominal value of the communication speed in the transmission method A may be used, or a performance of the communication speed in the transmission method A and the channel A may be used.

In step S1212, a communication amount of the target communication is acquired. This process aims to calculate a communication time Y in the transmission method A and the channel A and a communication time Z in the transmission method B and the channel B.

In step S1214, the communication time Y in the transmission method A and the channel A is calculated. A nominal value of the communication speed in the transmission method A may be used, or a performance of the communication speed in the transmission method A and the channel A may be used.

In step S1216, the communication time Z in the transmission method B and the channel B is calculated. A nominal value of the communication speed in the transmission method B may be used, and a performance of the communication speed in the transmission method B and the channel B may be used.

In step S1218, it is determined whether "remaining communication time X+communication time Y≤communication time Z." If it is determined that "remaining communication time X+communication time Y≤communication time Z," the process proceeds to step S1220. Otherwise, the process proceeds to step S1222. Here, the "remaining communication time X+communication time Y" indicates a time until a communication is completed in a case where the communication is conducted using by the transmission method A and the channel A, that is, in a case where a communication is conducted by the transmission method A and the channel A after standing by until the communication that is being conducted by the communication A and the channel A is ended. This is because it may be beneficial to stand by until the transmission method A and the channel A become free in a case where the communication speed of the transmission method A and the channel A is faster than that of the transmission method B and the channel B and the communication capability of the target communication is large. For example, if the transmission method A is IEEE802.11ad and if a high resolution image or the like is transmitted, it may be beneficial to wait for the transmission method A.

In step S1220, the wireless communication module 140 waits for the end of the transmission method A and the channel A that are conducting a communication, and conducts the target communication by the transmission method A and the channel A.

In step S1222, the wireless communication module 140 conducts a communication by the transmission method B and the channel B.

In step S1224, the wireless communication module 140 starts a communication by the transmission method A and the channel A.

Figure 13:
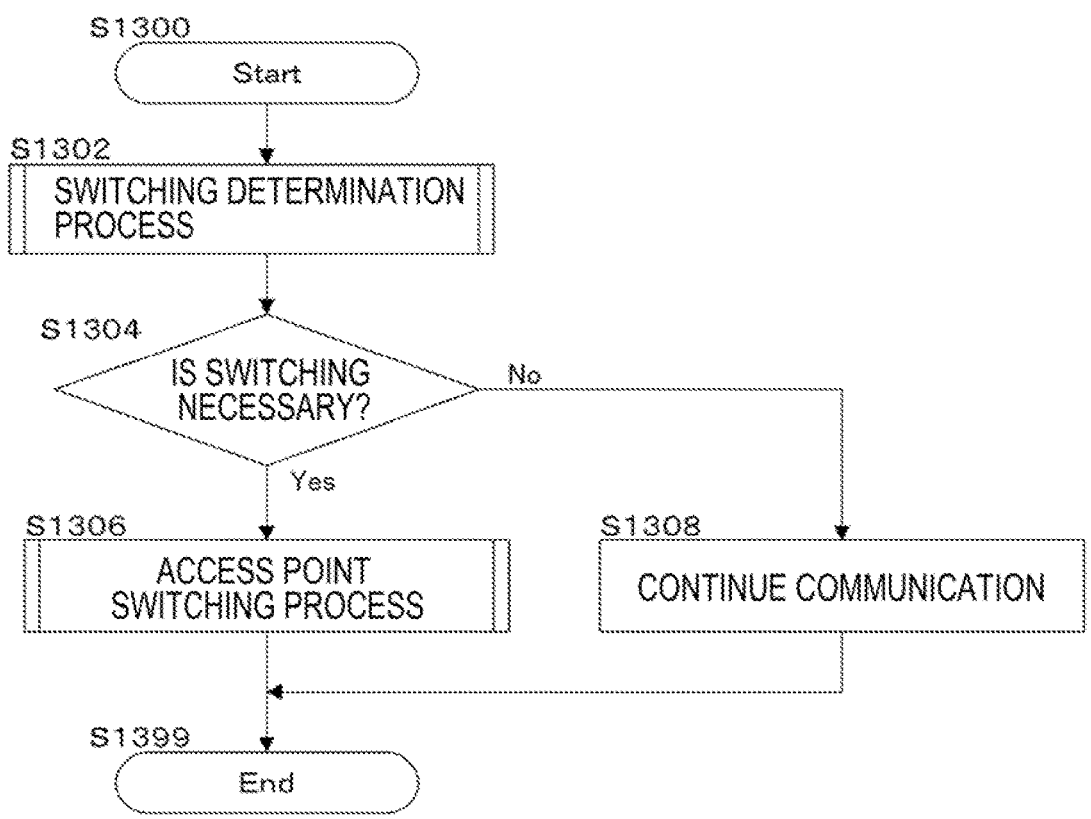
FIG. 13 is a flowchart illustrating an exemplary process according to the exemplary embodiment.

FIG. 13 is a flowchart illustrating an exemplary process according to the present exemplary embodiment. This process switches the access point 180 that is conducting a communication.

In step S1302, the switching determination module 130 performs a switching determination process. The detailed process of step S1302 will be described later using the flowchart illustrated in an example of FIG. 14.

In step S1304, it is determined whether a switching is necessary, as a result of the process in step S1302. If it is determined that a switching is necessary, the process proceeds to step S1306. Otherwise, the process proceeds to step S1308.

In step S1306, the access point switching module 135 performs an access point switching process. A detailed process of step S1306 will be described later using the flowchart illustrated in an example of FIG. 15.

In step S1308, the wireless communication module 140 continues the communication by the current transmission method and channel.

Figure 14:
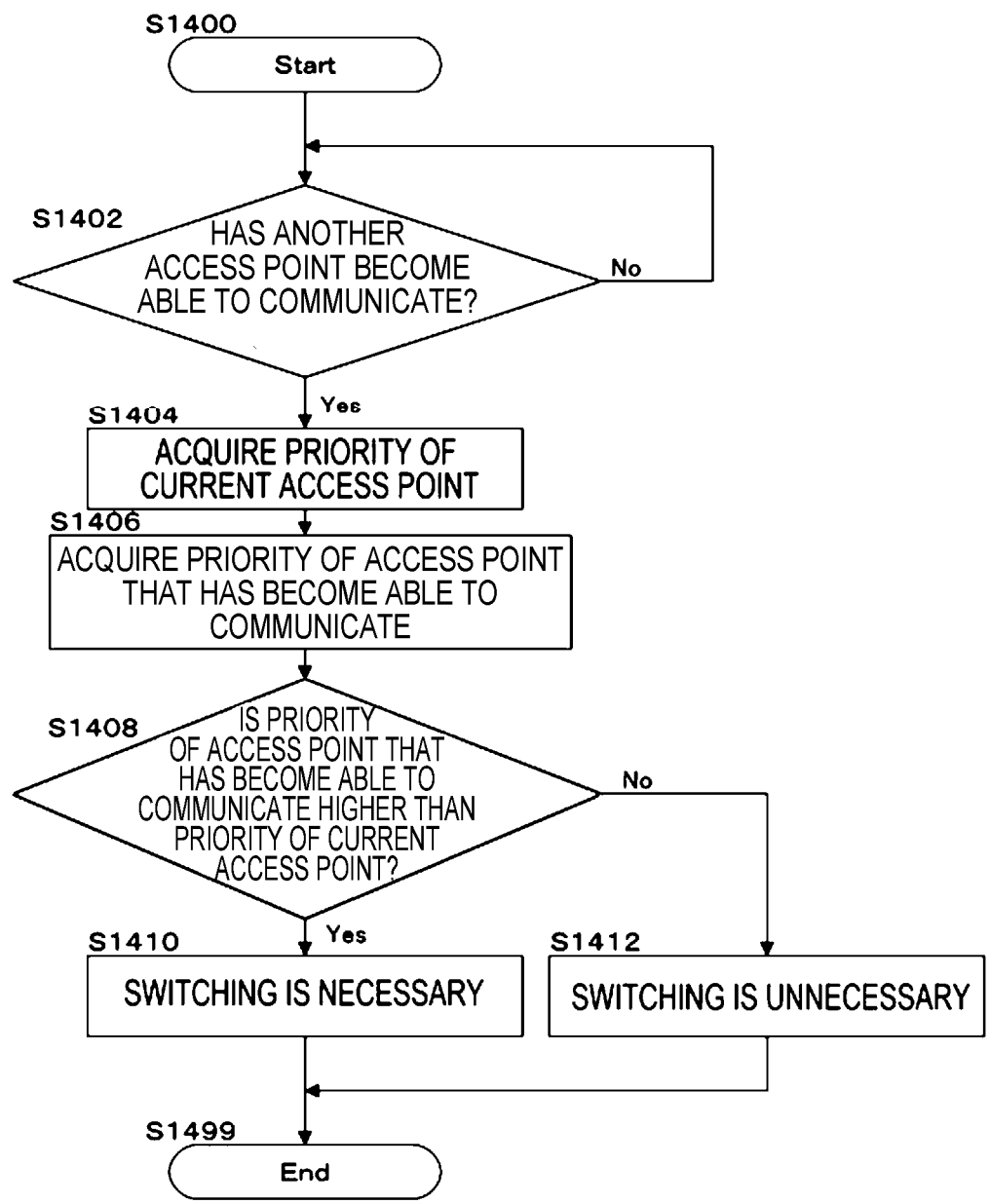
FIG. 14 is a flowchart illustrating an exemplary process according to the exemplary embodiment.

FIG. 14 is a flowchart illustrating an exemplary process according to the present exemplary embodiment (mainly, the switching determination module 130).

In step S1402, it is determined whether another access point 180 has become able to communicate. If it is determined that another access point 180 has become able to communicate, the process proceeds to step S1404. Otherwise, the process stands by until another access point 180 becomes able to communicate. In step S1508 of a flowchart illustrated in an example of FIG. 15, a communication is started by the "other access point 180" which is determined in step S1402 to have become able to communicate.

In step S1404, the priority of the current access point 180 is acquired. For example, the priority of the current access point 180 is acquired using the priority tables 700, 800, and 900. Here, if priorities follow a communication quality, the priority table 800 may be used, or the current communication quality may be used.

In step S1406, the priority of the access point 180 that has become able to communicate is acquired. For example, the priority of the current access point 180 is acquired using the priority tables 700, 800, and 900. Here, if priorities follow a communication quality, the priority table 800 may be used, or the current communication quality may be used.

In step S1408, it is determined whether the priority of the access point 180 that has become able to communicate is higher than the priority of the current access point 180. If it is determined that the determination is Yes, the process proceeds to step S1410. Otherwise, the process proceeds to step S1412.

In step S1410, it is determined that a switching is necessary.

In step S1412, it is determined that a switching is unnecessary.

Figure 15:
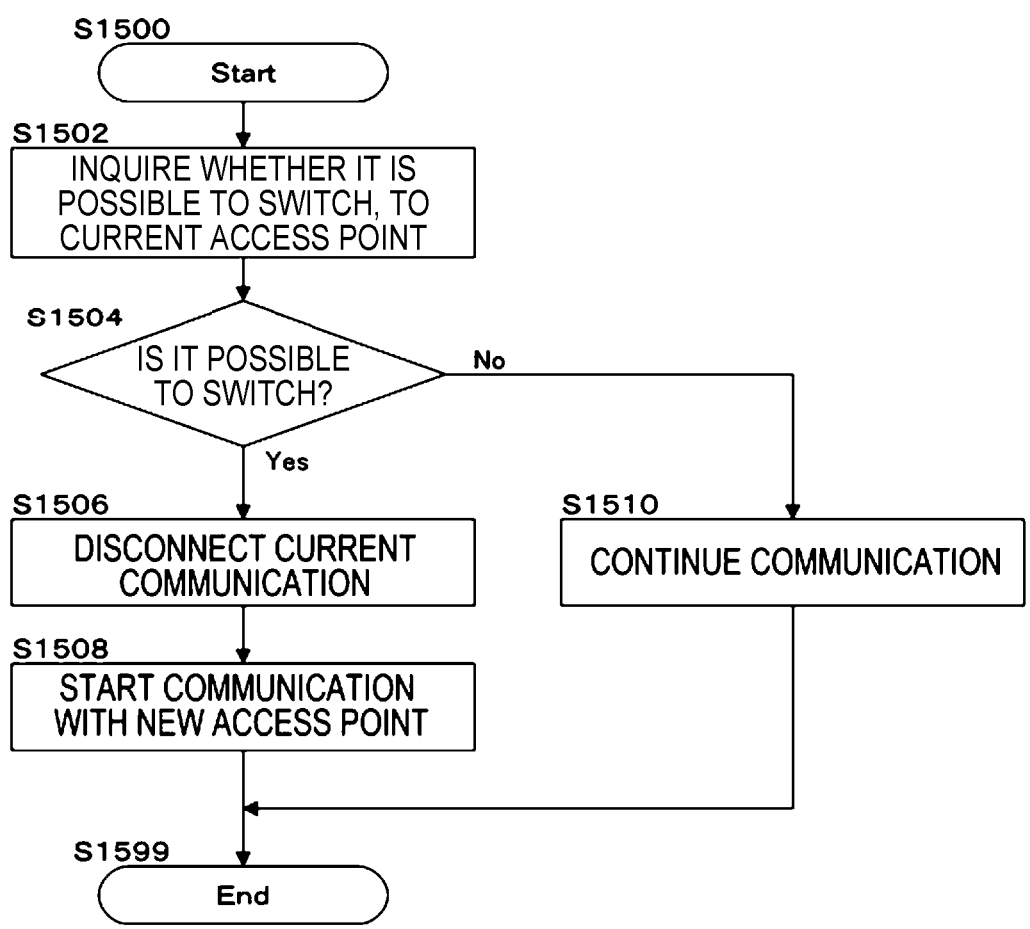
FIG. 15 is a flowchart illustrating an exemplary process according to the exemplary embodiment.

FIG. 15 is a flowchart illustrating an exemplary process according to the present exemplary embodiment (access point switching module 135).

In step S1502, it is inquired whether it is possible to switch, to the access point 180 that is conducting a communication.

In step S1504, it is determined whether a reply from the access point 180 indicates that it is possible to switch. If it is determined that the reply indicates that it is possible to switch, the process proceeds to step S1506. Otherwise, the process proceeds to step S1510.

In step S1506, the current communication is disconnected.

In step S1508, a communication with a new access point 180 is started. For example, a communication may be conducted from the beginning again with the new access point 180, or the remaining communication may be conducted with the new access point 180.

In step S1510, the wireless communication module 140 continues the current communication.

Figure 16:
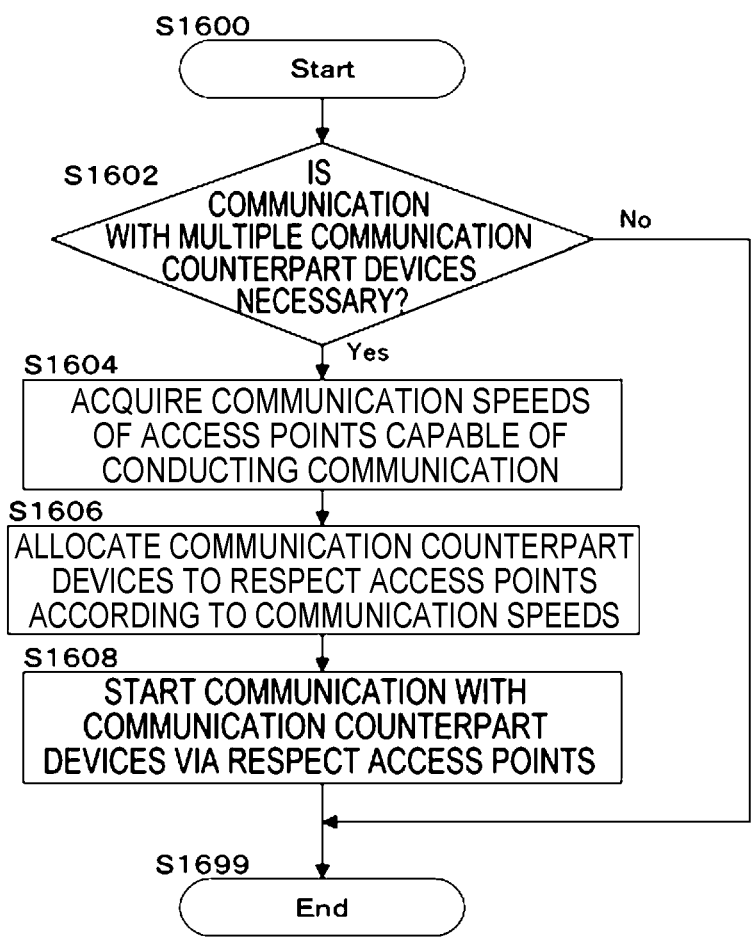
FIG. 16 is a flowchart illustrating an exemplary process according to the exemplary embodiment.

FIG. 16 is a flowchart illustrating an exemplary process according to the present exemplary embodiment.

In step S1602, it is determined whether a communication with multiple communication counterpart devices is necessary. If it is determined that the communication is necessary, the process proceeds to step S1604. Otherwise, the process is ended (step S1699). Here, the "communication with multiple communication counterpart devices" indicates a communication with communication devices via the access point 180. This corresponds to, for example, a case where the information processing apparatus 100 conducts a broadcasting.

If the process proceeds to step S1604, a process of connecting to multiple access points 180 and allocating communication counterpart devices to the multiple access points 180 is performed. If the communication is sequentially conducted using only one access point 180(A), a total time increases. Thus, this process reduces the total time by using another access point 180 (whose communication speed may be slower than that of the access point 180(A)). In addition, the connection to the access points 180 may be performed by performing the process according to the flowchart illustrated in the example of FIG. 10.

In step S1604, communication speeds of the access points 180 capable of conducting a communication are acquired.

In step S1606, communication counterpart devices are allocated to the respective access points 180 according to the communication speeds. For example, if a communication is conducted with 100 communication counterpart devices, the communication counterpart devices may be allocated to the access points 180 according to the communication speeds as follows:

(1) 47 communication counterpart devices are allocated to the access point A: 180A of IEEE802.11ad.

(2) 47 communication counterpart devices are allocated to the access point B: 180B of IEEE802.11ad.

(3) 6 communication counterpart devices are allocated to the access point C: 180C of IEEE802.11ac.

In step S1608, a communication is started with the communication counterpart devices via the respective access points 180.

Figure 17:
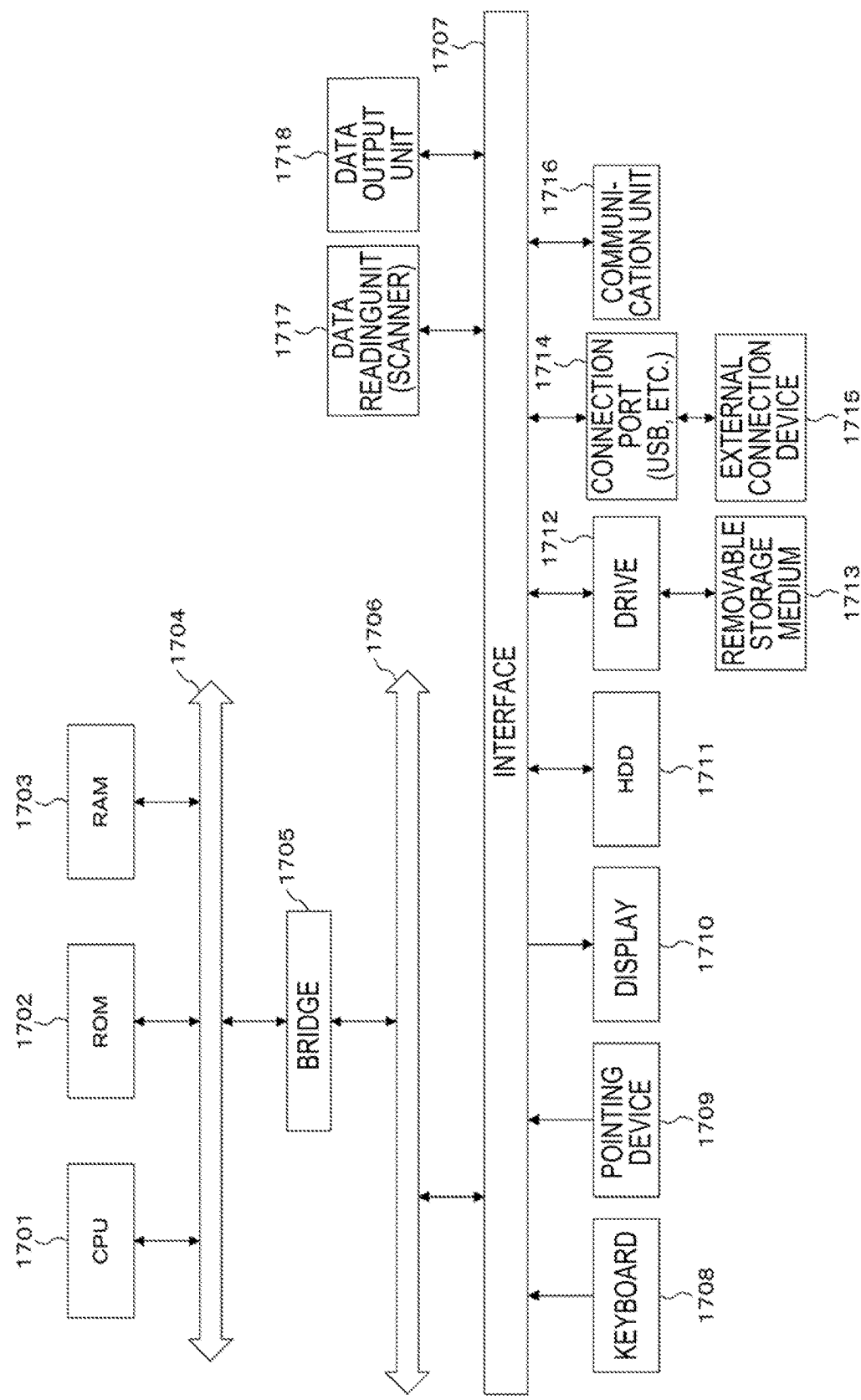
FIG. 17 is a block diagram illustrating an exemplary hardware configuration of a computer implementing the exemplary embodiment.

An exemplary hardware configuration of the information processing apparatus of the present exemplary embodiment will be described with reference to FIG. 17. The configuration illustrated in FIG. 17 is implemented with, for example, a personal computer (PC), and represents an exemplary hardware configuration provided with a data reading unit 1717 such as a scanner and a data output unit 1718 such as a printer. In addition, while the example illustrated in FIG. 3 represents the configuration mainly serving as a chip using the ASIC or the like, the example illustrated in FIG. 17 mainly represents a functional configuration that is implemented with a personal computer or the like. For example, a CPU 1701 takes in charge of the functions of the SoC 300 and the ASIC 330.

The CPU 1701 is a controller that performs processes according to a computer program describing an execution sequence of each of the various modules described in the above-described exemplary embodiment, that is, the communication control module 110, the access point selection module 120, the communication quality acquisition module 125, the switching determination module 130, the access point switching module 135, and the wireless communication module 140 and others.

A read only memory (ROM) 1702 stores programs, operation parameters and others used by the CPU 1701. A RAM 1703 stores programs used in the execution by the CPU 1701, parameters appropriately varying in the execution and others. These components are connected to each other by a host bus 1704 configured with a CPU bus or the like.

The host bus 1704 is connected to an external bus 1706 such as a peripheral component interconnect/interface (PCI) bus via a bridge 1705.

A keyboard 1708 and a pointing device 1709 such as a mouse are devices operated by an operator. A display 1710 is, for example, a liquid crystal display device or a cathode ray tube (CRT), and displays various types of information as texts and image information. In addition, a touch screen or the like having the functions of both the pointing device 1709 and the display 1710 may be used. In this case, the function of the keyboard may be implemented by drawing the keyboard using software (also called a so-called software keyboard, screen keyboard or the like) on the screen (the touch screen), without the physical connection as in the keyboard 1708.

A hard disk drive (HDD) 1711 is equipped with a hard disk (which may be a flash memory or the like) therein, drives the hard disk, and stores or plays programs or information executed by the CPU 1701. The hard disk implements the function of the access point information storage module 115 and stores the access point information table 600, the priority tables 700, 800, and 900, communication contents and others. Further, in the hard disk, other various data and various computer programs are stored.

A drive 1712 reads data or programs stored in a removable storage medium 1713 such as a mounted magnetic disc, an optical disc, a magneto-optical disc, or a semiconductor memory, and supplies the data or programs to the interface 1707, the external bus 1706, the bridge 1705, and the RAM 1703 connected via the host bus 1704. In addition, the removable storage medium 1713 may also be used as a data storing area.

A connection port 1714 is a port for connection of an external connection device 1715, and includes connection units such as USB and IEEE1394. The connection port 1714 is connected to the CPU 1701 and others via the interface 1707, the external bus 1706, the bridge 1705, the host bus 1704 and others. A communication unit 1716 is connected to a communication line and performs a process of a data communication with an external device. The data reading unit 1717 is, for example, a scanner and performs a document reading process. The data output unit 1718 is, for example, a printer and performs a document data outputting process.

The hardware configuration of the information processing apparatus illustrated in FIG. 17 represents an exemplary configuration. The present exemplary embodiment is not limited to the configuration illustrated in FIG. 17, and may be any configuration that may execute the modules described in the present exemplary embodiment. For example, some of the modules may be configured with dedicated hardware (for example, application specific integrated circuit (ASIC)), and some of the modules may be in the form in which the modules are present in an external system and connected via a communication line. Further, the multiple systems illustrated in FIG. 17 may be connected to each other via a communication line and cooperate with each other. In addition, especially, the multiple systems of FIG. 12 may be incorporated in a personal computer, a portable information communication device (including a mobile phone, a smart phone, a mobile device, a wearable computer, and the like), an information appliance, a robot, a copier, a facsimile, a scanner, a printer, a multifunction machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, if the communication quality is not improved even by changing a transmission method, the channel may be switched to another channel. Here, specifically, the case where the "communication quality is not improved" corresponds to (i) a case where a difference between values of the communication quality before and after the transmission method switching is within a predetermined value or (ii) a case where the communication quality after switching between the transmission methods is worse than that before switching between the transmission methods.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disd (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be divided and stored in multiple storage media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    selection means, wherein if there exist a plurality of access points capable of conducting a communication using a predetermined transmission method among transmission methods by which the information processing apparatus is capable of conducting a wireless communication, the selection means selects an access point having a high communication quality; and
    communication means for conducting a communication with the access point selected by the selection means, wherein
    the predetermined transmission method is a transmission method having the fastest communication speed among the transmission methods by which the information processing apparatus is capable of conducting a communication, and
    the communication means is configured to communicate with a plurality of access points by allocating more communication destinations to an access point capable of conducting a communication using the predetermined transmission method than those allocated to access points using another transmission method.

2. An information processing apparatus comprising:
    a controller configured to select an access point having a high communication quality from among a plurality of access points capable of conducting a communication using a predetermined transmission method among transmission methods by which the information processing apparatus is capable of conducting a wireless communication; and a wireless transmitter configured to conduct a communication with the access point selected by the controller, wherein the predetermined transmission method is a transmission method having the fastest communication speed among the transmission methods by which the information processing apparatus is capable of conducting a communication, and the controller is configured to cause the wireless transmitter to communicate with a plurality of access points by allocating more communication destinations to an access point capable of conducting a communication using the predetermined transmission method than those allocated to access points using another transmission method.

3. The information processing apparatus according to claim 2, wherein the controller selects the access point according to predetermined priorities.

4. The information processing apparatus according to claim 3,
wherein the controller is configured to set the predetermined priorities.

5. The information processing apparatus according to claim 4, wherein the controller is configured to set the predetermined priorities by communicating with the plurality of access points periodically or at a time when power of the information processing apparatus is turned on.

6. A non-transitory computer readable medium storing an information processing program that, when executed, causes a computer to:
select an access point having a high communication quality from among a plurality of access points capable of conducting a communication using a predetermined transmission method among transmission methods by which the computer is capable of conducting a wireless communication; and control a wireless transmitter to conduct a communication with the access point selected by the computer, wherein the predetermined transmission method is a transmission method having the fastest communication speed among the transmission methods by which the wireless transmitter is capable of conducting a communication, and the computer is configured to cause the wireless transmitter to communicate with a plurality of access points by allocating more communication destinations to an access point capable of conducting a communication using the predetermined transmission method than those allocated to access points using another transmission method.

* * * * *